(12) United States Patent
Herenyi et al.

(10) Patent No.: US 7,640,542 B2
(45) Date of Patent: Dec. 29, 2009

(54) MANAGING MIDLET SUITES IN OSGI ENVIRONMENT

(75) Inventors: Gergely Herenyi, Budapest (HU); Robert Fajta, Budapest (HU); Andras Boros, Budapest (HU)

(73) Assignee: Nokia Corporation, Espoo (FI)

( * ) Notice: Subject to any disclaimer, the term of this patent is extended or adjusted under 35 U.S.C. 154(b) by 761 days.

(21) Appl. No.: 11/098,576

(22) Filed: Mar. 24, 2005

(65) Prior Publication Data

US 2006/0233126 A1 Oct. 19, 2006

(51) Int. Cl.
*G06F 9/445* (2006.01)
(52) U.S. Cl. ............................. 717/177; 717/172
(58) Field of Classification Search .................. None
See application file for complete search history.

(56) References Cited

U.S. PATENT DOCUMENTS

2003/0224810 A1* 12/2003 Enzmann et al. ............ 455/466
2004/0194059 A1* 9/2004 Akella et al. ................ 717/118
2005/0097052 A1* 5/2005 Systa et al. ................... 705/51
2006/0140144 A1* 6/2006 Bruner et al. ................ 370/328

FOREIGN PATENT DOCUMENTS

EP          1445696        8/2004
WO      WO 2004049750     6/2004

* cited by examiner

*Primary Examiner*—Chuck O Kendall
(74) *Attorney, Agent, or Firm*—Alfred A. Fressola; Ware, Fressola, Van Der Sluys & Adolphson LLP

(57) ABSTRACT

The invention discloses deploying MIDlet suites in an Open Services Gateway Initiative environment. A MIDlet suite is re-packaged by adding to it an interface element to the Open Services Gateway Initiative environment. The invention allows using deployed MIDlet suites in an Open Services Gateway Initiative environment in a way that requires significantly less user interaction than prior art arrangements.

16 Claims, 3 Drawing Sheets

MANAGING MIDLET SUITES IN OSGI ENVIRONMENT

BACKGROUND OF THE INVENTION

1. Field of the Invention

The invention relates to MIDlet suites and Open Services Gateway Initiative. In particular, the invention relates to a novel and improved way of deploying MIDlet suites in an Open Services Gateway Initiative environment.

2. Description of the Related Art

Today more and more various terminal devices and embedded devices include a Java programming language platform to allow running of Java applications. One of these Java platforms is Java 2 Platform, Micro Edition (J2ME). J2ME is targeted particularly at embedded systems with limited resources, such as mobile phones, pagers, personal digital assistants, smart cards and set-top boxes. Due to differences in capabilities of devices implementing J2ME, J2ME has been segmented via configurations and profiles. A configuration-profile pair defines a minimum set of application programming interfaces or APIs a device must support. Typically, this set can be extended with additional optional libraries. Two of the configurations included in J2ME are Connected, Limited Device Configuration (CLDC) and Connected Device Configuration (CDC).

CLDC is targeted at devices with limited resources, such as mid- and low-end mobile phones, for example. CLDC defines a virtual machine and a set of libraries which are scaled down compared to those specified in the Java Language Specification. Mobile Information Device Profile (MIDP) is a profile specified especially for the CLDC. MIDP defines a simple model for application programming, including an application model, a user interface (e.g. textboxes, forms) and networking.

CDC is targeted at relatively powerful devices which are less resource limited than those targeted by CLDC, such as e.g. smart phones, communicators and personal digital assistants. CDC defines a virtual machine that is fully compliant with the Java Language Specification. CDC is usually accompanied by a Foundation Profile (FP) which extends the basic set of libraries of the CDC for e.g. input/output, networking and security. However, FP does not specify an application model. The application model and user interface libraries are disclosed by a Personal Profile (PP).

A Java application that conforms to MIDP and CLDC is called a MIDlet. MIDlets are typically targeted at devices that provide some level of network connectivity. The devices that will run MIDlets typically also have several common attributes: limited screen size, memory and processing power. As described above, MIDP and CLDC are designed to address these constraints.

MIDlets are often packaged and distributed as MIDlet Suites. A MIDlet Suite is a set of one or more MIDlets plus resource files that may be required by these MIDlets. The MIDlet Suite is typically deployed as a Java Archive (JAR) file. Furthermore, a Java Application Descriptor (JAD) file may be associated with the JAR file. The JAR file comprises one or more Java class files, and a manifest file describing the contents of the JAR file. The JAR file may further comprise resources, such as e.g. images and application data. The manifest file included in the JAR file is typically a text file containing various attributes related to the MIDlet Suite, such as a name of the MIDlet Suite, a version number of the MIDlet Suite, a vendor name of the MIDlet Suite, a J2ME Profile required by the MIDlet Suite, and a J2ME Configuration required by the MIDlet Suite. The JAD file is typically a text file containing administrative information about the MIDlet Suite and the JAR file the MIDlet suite is packed into, such as a name, JAR file size, version number, vendor information and a Uniform Resource Locator (URL) address of the JAR file. An object of the JAD file is to facilitate getting information about the JAR file: since typically the JAD file is significantly smaller than the JAR file which comprises the entire MIDlet suite, it is faster to download only the JAD file rather than the JAR file.

In recent years MIDP in combination with CLDC has become extremely popular. In mobile phones, it is today the dominant Java platform for third party applications. In other words, there is a vast amount of MIDlets already developed, and more are being developed.

Yet the platform consisting of MIDP and CLDC has also met more and more criticism for not being rich and attractive enough, and for remaining behind the standard Java platform in terms of APIs and applied virtual machine technologies.

One of proposed solutions to the above criticism is called Open Service Gateway Initiative (OSGi) which provides a richer application framework than the platform consisting of MIDP and CLDC. E.g. Java Specification Request (JSR) 232 proposes using OSGi as an underlying application framework for mobile devices. OSGi is a generic, service centric execution environment. It specifies a generic framework and a core set of service interfaces that enable delivery of multiple value added service implementations, potentially from different vendors. OSGi provides a general-purpose, secure and managed Java framework that supports the deployment of extensible and downloadable service applications known as bundles.

OSGi-compliant devices can download and install OSGi bundles, and remove them when they are no longer required. Bundles can register a number of services that can be shared with other bundles under control of OSGi. OSGi can run on top of CDC and FP. In OSGi several bundles can be run simultaneously on a single virtual machine, whereas in previous Java frameworks only one Java application may be run on one virtual machine. As opposed to the platform consisting of MIDP and CLDC, with OSGi there is no need to load and execute the virtual machine as many times as the number of running Java applications. Thus memory consumption is reduced.

However, OSGi does not support managing or executing MIDlets. Yet such support is imperative due to the vast amount of MIDlets developed.

An attempt at enabling execution of MIDlet suites on OSGi is provided by a corporation called Prosyst (http://www.prosyst.com). The solution by Prosyst is a bundle called MIDPLauncher that, when started, shows the installed MIDlet suites on a graphical user interface and registers a service that can be used by other bundles to install, start, stop uninstall or update a MIDlet suite.

However, there is a significant drawback to the above solution by Prosyst: it requires extensive and cumbersome user interaction. Once the MIDPLauncher is stopped, the MIDlet suites become completely unavailable to the user and the OSGi environment. Therefore, when the user wants to execute a MIDlet and the MIDPLauncher is not already running, the user is first required to launch the MIDPLauncher in order to enable execution of the MIDlet. Likewise, if the MIDlet suite comprises several MIDlets, the user is required to launch the MIDPLauncher before being able to select a MIDlet to be executed. Furthermore, even while the MIDPLauncher is running, the OSGi environment sees only the MIDPLauncher bundle rather than the separate MIDlet suites.

Therefore, an object of the present invention is to alleviate the problems described above and to introduce a mechanism that allows using deployed MIDlet suites in an Open Services Gateway Initiative environment with no user interaction or at least with significantly less user interaction than with prior art arrangements. A further object of the present invention is to allow starting, stopping and uninstalling the deployed MIDlet suites without requiring a management application or any other application associated with the Open Services Gateway Initiative environment to be running at the same time. Yet a further object of the present invention is to allow executing multiple MIDlets in parallel in the Open Services Gateway Initiative environment.

SUMMARY OF THE INVENTION

A first aspect of the present invention is a method of deploying MIDlet suites in an Open Services Gateway Initiative environment. According to the method, a MIDlet suite is re-packaged by adding to it an interface element to the Open Services Gateway Initiative environment. It is to be understood that in the context of the present invention the term 'interface element' refers to an element providing a connection between the Open Services Gateway Initiative environment and the re-packaged MIDlet suite in order to enable the Open Services Gateway Initiative environment to launch and stop at least one MIDlet of the re-packaged MIDlet suite.

A second aspect of the present invention is a device for deploying MIDlet suites in an Open Services Gateway Initiative environment. The device comprises a re-packager arranged to re-package a MIDlet suite by adding to it an interface element to the Open Services Gateway Initiative environment.

A third aspect of the present invention is a computer program product embodied on a computer readable medium for deploying MIDlet suites in an Open Services Gateway Initiative environment. The computer program controls a data-processing device to perform the step of re-packaging a MIDlet suite by adding to it an interface element to the Open Services Gateway Initiative environment.

In an embodiment of the invention, at least one configuration parameter specific to the Open Services Gateway Initiative environment is added to the MIDlet suite in addition to the interface element while re-packaging the MIDlet suite.

In an embodiment of the invention, prior to the re-packaging, Connected Limited Device Configuration compliancy of the MIDlet suite is validated.

In an embodiment of the invention, at least one Mobile Information Device Profile application programming interface package is exported to a namespace database maintained by the Open Services Gateway Initiative environment. This allows the exported at least one Mobile Information Device Profile application programming interface package to be shared by re-packaged MIDlet suites.

In an embodiment of the invention, at least one of the added interface element and the added at least one configuration parameter is utilized for at least one of installing the re-packaged MIDlet suite and executing the installed MIDlet suite as a standard Open Services Gateway Initiative application.

In an embodiment of the invention, the interface element comprises at least one Java class file.

In an embodiment of the invention, at least one configuration parameter is arranged into one of a manifest file and an additional configuration parameter file.

The invention allows using deployed MIDlet suites in an Open Services Gateway Initiative environment in a way that requires significantly less user interaction than prior art. For example, the invention allows starting, stopping and uninstalling the deployed MIDlet suites without requiring a management application or any other application associated with an Open Services Gateway Initiative environment to be running at the same time. That is, once a MIDlet suite has been re-packaged in accordance with the invention, it can be launched directly, i.e. without having to first launch a management application, such as e.g. the above prior art MIDPLauncher. Furthermore, the invention provides MIDP functionality in an Open Services Gateway Initiative environment. Furthermore, the invention allows executing multiple MIDlets in parallel in an Open Services Gateway Initiative environment. Furthermore, the invention reduces memory footprint of each installed MIDlet suite since the MIDlet suites are deployed and executed on a single virtual machine. Furthermore, the invention minimizes the overhead of each re-packaged MIDlet suite by relying on the namespace database of the OSGi environment to share the standard MIDP APIs as well as the runtime management APIs.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE PREFERRED EMBODIMENTS

Reference will now be made in detail to the embodiments of the invention, examples of which are illustrated in the accompanying drawings.

Figure 1:
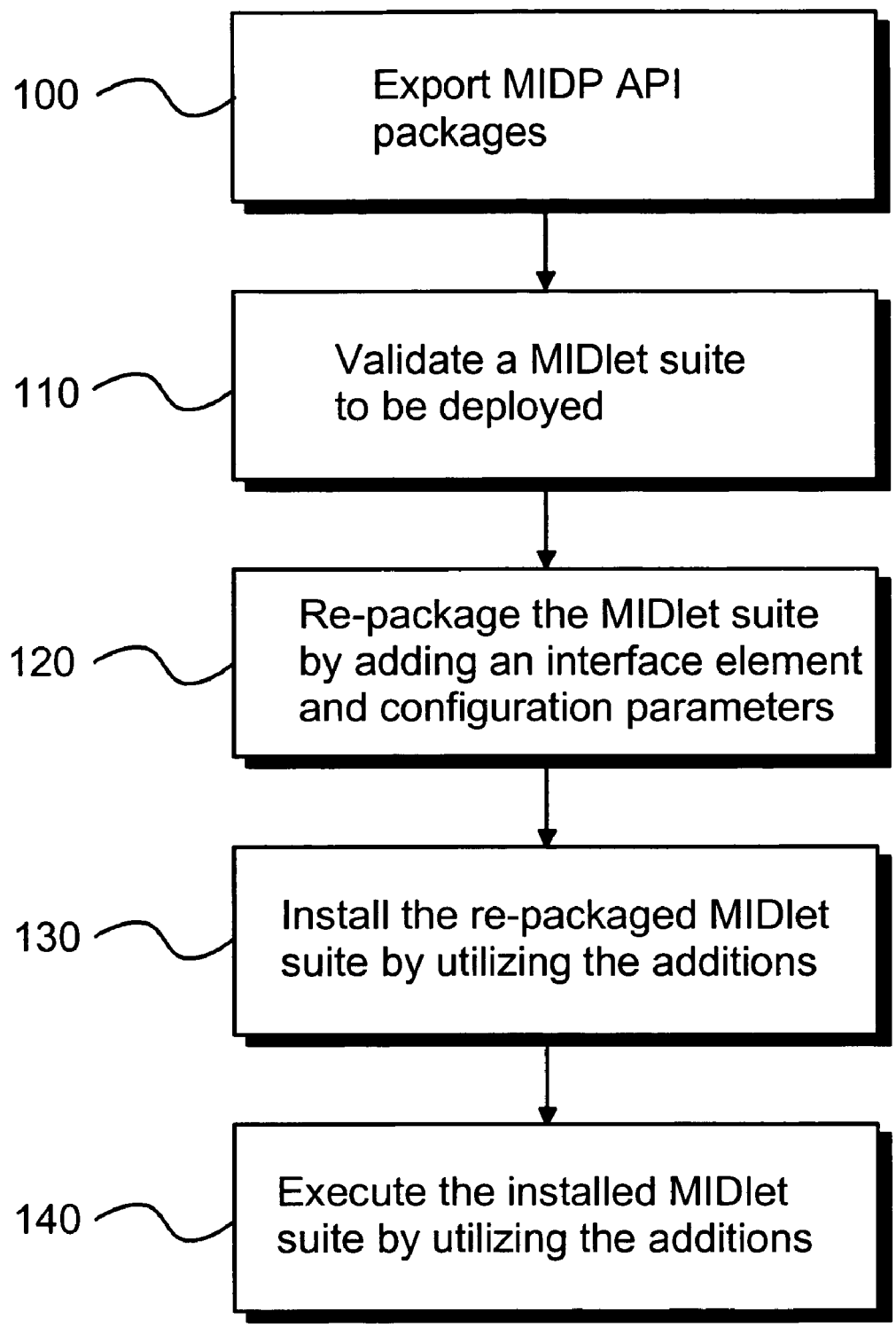
FIG. 1 is a flow diagram illustrating a method according to an embodiment of the present invention.

FIG. 1 illustrates an embodiment of the method of the present invention relating to deploying MIDlet suites in an Open Services Gateway Initiative environment. At step 100 MIDP API packages are exported to a namespace database maintained by the OSGi environment. The MIDP API packages are to be shared by re-packaged MIDlet suites.

Among the API packages exported may be e.g. standard MIDP API packages (such as e.g. javax.microedition.io, javax.microedition.rms, javax.microedition.lcdui and javax.microedition.midlet), internal implementation packages of the MIDP, additional runtime management API packages and one or more packages which contain MIDlet suite management service interfaces. Exporting the MIDP API packages ensures sharing the MIDP API implementation. By sharing the MIDP packages, memory footprint of each installed MIDlet suite is reduced, as MIDP API classes need to be loaded only once. The above standard MIDP APIs are those specified in the MIDP specification. The above runtime management APIs are internal APIs responsible for enabling a user to select the MIDlet to be launched, if the embedded MIDlet suite contains more than one MIDlet, and to dispatch the MIDlet.

In the embodiment of the invention illustrated in FIG. 1, CLDC compliancy of the MIDlet suite is validated, step 110. The reason for the validation is the fact that, due to compatibility between the CDC and CLDC APIs, the CLDC APIs may sometimes be replaced with the corresponding CDC APIs, and consequently the MIDP may be implemented on top of CDC. However, by replacing the CLDC APIs with the CDC APIs correctness of a MIDlet cannot be detected. A correct or well-behaved MIDlet must use only that subset of the CDC APIs which is also present in the CLDC APIs, whereas an ill-behaved MIDlet may use the entire set of CDC APIs. Therefore, in order to rule out the ill-behaved MIDlets, the CLDC compliancy of the MIDlet suite is validated or checked. This may be achieved e.g. by scanning the constant pool of the MIDlet class files. If the MIDlet suite is found to be non CLDC compliant, the MIDlet suite deployment process will be aborted. Thus, the validation step ensures that only correct MIDP applications will be deployed.

Next, at step 120, the validated MIDlet suite is re-packaged into a standard OSGi bundle by adding to it an interface element to the Open Services Gateway Initiative environment. In the embodiment of the invention illustrated in FIG. 1, the step 120 of re-packaging further comprises adding to the MIDlet suite at least one configuration parameter specific to the OSGi environment. The object of the interface element is to enable the OSGi environment to connect to the re-packaged MIDlet suite in order to launch and stop at least one MIDlet of the re-packaged MIDlet suite. The interface element may comprise at least one Java class file. For example, the interface element may comprise e.g. an implementation of org.osgi.framework.BundleActivator interface class file.

Alternatively, if the OSGi environment supports declarative services, the interface element may comprise at least one file, e.g. an Extensible Markup Language (XML) file, configured to declare a service for launching and stopping the re-packaged MIDlet suite.

It is to be understood that the term 'declarative service' refers to a feature of OSGi, known in itself to a person skilled in the art, for providing services. In an OSGi environment supporting declarative services, an OSGi bundle can declare in an XML file that it provides services to the rest of the system. These services are registered by a Service Component Runtime (SCR) on behalf of the bundle based on the contents of the XML file.

At least one OSGi environment specific configuration parameter may be comprised e.g. in a manifest file. Since the JAR file in which the MIDlet suite is contained typically already comprises a manifest file describing the contents of the JAR file, in an embodiment of the invention this former manifest file is replaced with the manifest file of the invention. The former manifest file may be e.g. renamed, and the manifest file of the invention added in its place. Furthermore, if there is a JAD file associated with the JAR file of the MIDlet suite, the JAD file may be packed into the re-packaged MIDlet suite as well. The configuration parameters comprised in the manifest file may specify e.g. at least one of an activator class of the re-packaged MIDlet suite, and package import statements. Furthermore, one or more configuration parameters, including but not limited to requested permissions and policies, may be comprised in one or more additional configuration parameter files.

At step 130, the re-packaged MIDlet suite is installed as a standard OSGi application by utilizing at least one of the added interface element and the at least one configuration parameter. The installation may be performed by the OSGi environment since the re-packaged MIDlet suite is a standard OSGi bundle from the point of view of the OSGi environment. Finally, the installed MIDlet suite is executed as a standard Open Services Gateway Initiative application by utilizing at least one of the added interface element and the at least one configuration parameter, step 140.

In an embodiment of the invention, the runtime management APIs enable human users to choose a MIDlet for execution if the re-packaged MIDlet suite contains more than one MIDlet.

In another embodiment of the invention, the selection service is available to other OSGi bundles as well. In this embodiment, each re-packaged MIDlet suite registers a service object with a service registry of the OSGi environment. The service object may share information about the content of the re-packaged MIDlet suite. In addition, the service object may take over some of the responsibilities of the org.osgi.framework.BundleActivator implementation of the re-packaged MIDlet suite so that the MIDlet will be launched and stopped through the service object.

In an embodiment of the invention, each re-packaged MIDlet suite is started in a new thread and a context class loader of the respective re-packaged MIDlet suite is stored in that thread. That is, the newly created thread of the re-packaged MIDlet suite will inherit the context class loader from the first thread. The MIDP APIs are then able to use the information represented by the context class loader to distinguish between various re-packaged MIDlet suites. Thus, the invention allows running multiple re-packaged MIDlet suites in parallel.

Figure 2:
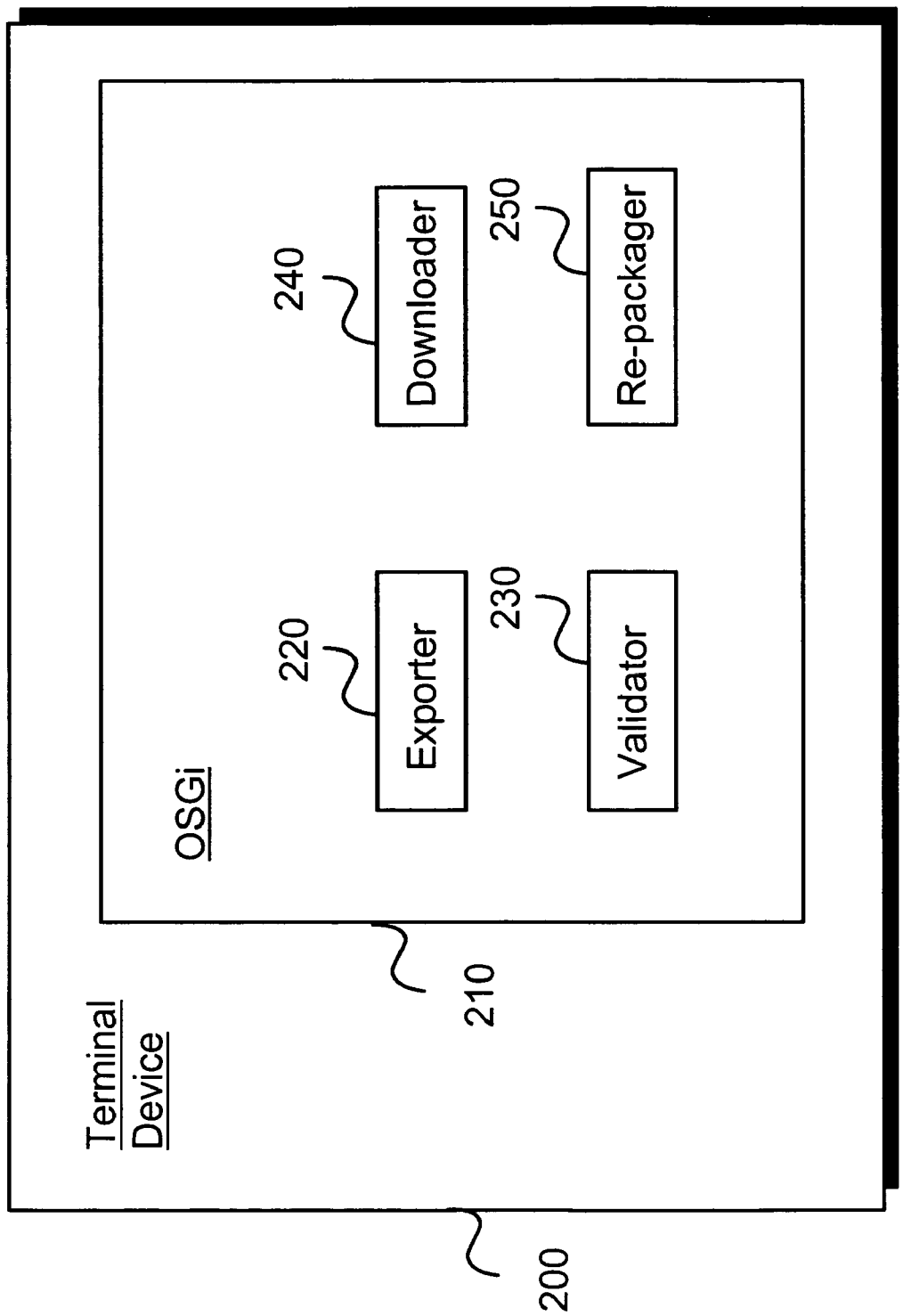
FIG. 2 is a block diagram illustrating a system according to an embodiment of the present invention, and FIG. 3 further illustrates deployment of a MIDlet suite according to an embodiment of the present invention.

FIG. 2 illustrates a terminal device 200 according to an embodiment of the present invention. The terminal device 200 implements an Open Services Gateway Initiative environment 210. The terminal device 200 may be e.g. a mobile phone, smart phone, pager, personal digital assistant, or a set-top box. The terminal device 200 comprises an exporter 220 configured to export, to a namespace database (not illustrated in FIG. 2) maintained by the Open Services Gateway Initiative environment 210, Mobile Information Device Profile application programming interface packages for sharing by re-packaged MIDlet suites. In an embodiment, the exporter 220 needs to export the MIDP APIs only once, for example when the exporter 220 is installed into the terminal device 200. In this way, the MIDP APIs can be shared by the deployed MIDlet suites.

The terminal device 200 further comprises a downloader 240 configured to download a MIDlet suite e.g. directly from a given Uniform Resource Locator (URL) address. Alternatively/additionally the downloader 240 may be configured to download MIDlet suites via a Bluetooth connection, infrared connection, a cable connection, or a Universal Serial Bus (USB) connection, or from a local storage. The terminal device 200 further comprises a validator 230 configured to validate Connected Limited Device Configuration compliancy of the downloaded MIDlet suite. The terminal device 200 further comprises a re-packager 250 configured to re-package the downloaded MIDlet suite by adding to it an interface element to the Open Services Gateway Initiative environment 210. In an embodiment of the invention, the re-packager 250 is further configured to add to the downloaded MIDlet suite at least one configuration parameter specific to the Open Services Gateway Initiative environment 210. At least one of the exporter 220, validator 230, downloader 240 and re-packager 250 may be implemented in software, hardware, or in a combination of software and hardware.

In an embodiment of the invention, at least one of the exporter 220, validator 230 and re-packager 250 may be implemented on a network server rather than on a terminal device. This embodiment allows deploying a MIDlet by pushing rather than by pulling. That is, the process of transferring the MIDlet suite to the terminal device may be initiated by the network server which pushes the MIDlet suite to the terminal device instead of the user initiating download of the MIDlet suite with the terminal device.

Figure 3:
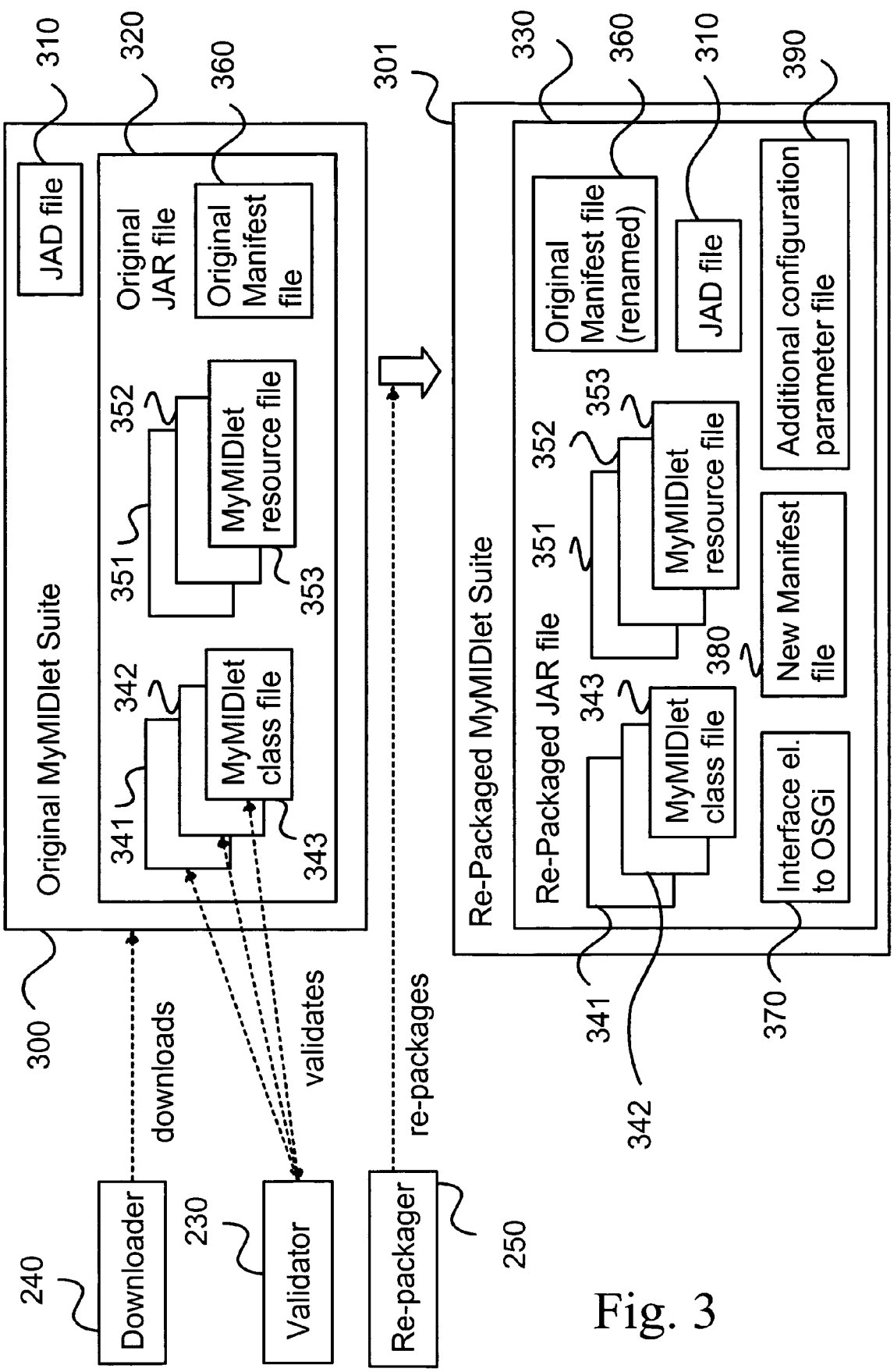

FIG. 3 further illustrates deployment of a MIDlet suite according to an embodiment of the present invention. In particular, FIG. 3 further illustrates how a MIDlet suite is re-packaged according to an embodiment of the present invention in order to deploy it in an OSGi environment. FIG. 3 depicts an example of a MIDlet suite before re-packaging: Original MyMIDlet Suite 300. Re-Packaged MyMIDlet Suite 301 represents the MIDlet suite after it has been re-packaged.

The Original MyMIDlet Suite 300 comprises a JAD file 310 and an Original JAR file 320. The Original JAR file 320 comprises an Original Manifest file 360, MyMIDlet Java class files 341, 342 and 343, as well as MyMIDlet resource files 351, 352 and 353. The MyMIDlet Java class files 341, 342 and 343 comprise the actual MIDlet or MIDlets (not illustrated in FIG. 3) of the Original MyMIDlet Suite 300. The MyMIDlet resource files 351, 352 and 353 comprise resources needed by the MIDlets of the Original MyMIDlet Suite 300, such as e.g. images and application data. The Original Manifest file 360 comprises various attributes related to the Original MyMIDlet Suite 300, such as e.g. the name of the Original MyMIDlet Suite 300, the version number of the Original MyMIDlet Suite 300, the vendor name of the Original MyMIDlet Suite 300, the name, icon and the main class of each MIDlet included in the Original MyMIDlet Suite 300, minimum profile requirement by the Original MyMIDlet Suite 300, and/or minimum configuration requirement by the Original MyMIDlet Suite 300. The JAD file 310 is e.g. a text file and it comprises administrative information about the Original MyMIDlet Suite 300 and the Original JAR file 320, such as the name of the Original MyMIDlet Suite 300, the size of the JAR file 320, the version number of the Original MyMIDlet Suite 300, the vendor name of the Original MyMIDlet Suite 300, and an URL address of the Original JAR file 320.

FIG. 3 also depicts the downloader 240 of FIG. 2 which is used to download the Original MyMIDlet Suite 300 e.g. directly from a given network Uniform Resource Locator URL address. Furthermore, FIG. 3 depicts the validator 230 of FIG. 2 which is used to validate the CLDC compliancy of the downloaded Original MyMIDlet suite. Furthermore, FIG. 3 depicts the re-packager 250 of FIG. 2 which is used to re-package the downloaded Original MyMIDlet Suite 300.

As illustrated in FIG. 3, the Re-Packaged MyMIDlet Suite 301 comprises a Re-Packaged JAR file 330. The Re-Packaged JAR file 330 comprises the above MyMIDlet Java class files 341, 342 and 343. The Re-Packaged JAR file 330 further comprises the above MyMIDlet resource files 351, 352 and 353. The Re-Packaged JAR file 330 further comprises the above JAD file 310. The Re-Packaged JAR file 330 further comprises the above Original Manifest file 360. In other words, the present invention requires no changes to the contents of the Java class files, resource files, JAD file or manifest file of a MIDlet suite to be deployed. However, as illustrated in FIG. 3, in the Re-Packaged MyMIDlet Suite 301 the JAD file 310 may be moved into the Re-Packaged JAR file 330, whereas in the Original MyMIDlet Suite 300 it was outside the Original JAR file 320. Furthermore, in the Re-Packaged MyMIDlet Suite 301 the Original Manifest file 360 may be renamed for reasons explained below.

The Re-Packaged JAR file 330 further comprises an Interface element 370 to the OSGi environment (not illustrated in FIG. 3) in which the Re-Packaged MyMIDlet Suite 301 is to be deployed. The Interface element 370 may comprise at least one Java class file. For example, the Interface element 370 may comprise an implementation of org.osgi.framework-.BundleActivator interface class file. Alternatively, the Interface element 370 may comprise a file, e.g. an XML file, configured to declare a service for launching and stopping Re-Packaged MyMIDlet Suite 301.

The Re-Packaged JAR file 330 further comprises a New Manifest file 380 which describes the contents of the Re-Packaged JAR file 330 and provides information about the Re-Packaged MyMIDlet Suite 301. The New Manifest file 380 uses headers to specify parameters that the OSGI environment needs in order to correctly install and activate the Re-Packaged MyMIDlet Suite 301. Also, the New Manifest file 380 states dependencies on other resources, such as Java packages, that must be available to the Re-Packaged MyMIDlet Suite 301 before it can run. The OSGI environment resolves these Java packages prior to launching the Re-Packaged MyMIDlet Suite 301. The New Manifest file 380 may designate the at least one Java class file comprised in the Interface element 370 to act as a bundle activator for launching and stopping the Re-Packaged MyMIDlet Suite 301. The OSGI environment will instantiate this Java class file and invoke methods to launch or stop the Re-Packaged MyMIDlet Suite 301 respectively. Since MIDlet suites may typically have only one manifest file, the Original Manifest file 360 is e.g. renamed so as not to be confused with the New Manifest file 380.

Furthermore, in the embodiment of the invention illustrated in FIG. 3 the Re-Packaged JAR file 330 further comprises an Additional configuration parameter file 390 which may comprise e.g. permissions requested by the Re-Packaged MyMIDlet Suite 301, policies and an URL address of the JAD file 310. The URL address may be utilized e.g. if the Re-Packaged MyMIDlet Suite 301 needs to be updated. Alternatively, the URL address may be included in the New Manifest file 380. It is to be understood that even though only one additional configuration parameter file is illustrated in FIG. 3, in other embodiments of the invention there may be more than one additional configuration parameter files, if needed. One or more of the additional configuration parameter files may be e.g. text files.

It is obvious to a person skilled in the art that with the advancement of technology, the basic idea of the invention may be implemented in various ways. The invention and its embodiments are thus not limited to the examples described above, instead they may vary within the scope of the claims.

What is claimed is:

1. A method comprising:
   re-packaging a MIDlet suite by adding to said MIDlet suite an interface element to an Open Services Gateway Initiative environment, wherein said MIDlet suite is deployed in said Open Services Gateway Initiative environment, and wherein said interface element is an element providing a connection between said Open Services Gateway Initiative environment and the re-packaged MIDlet suite in order to enable said Open Services Gateway Initiative environment to launch and stop at least one MIDlet of the re-packaged MIDlet suite.

2. The method according to claim 1, wherein said re-packaging said MIDlet suite further comprises adding to said MIDlet suite at least one configuration parameter specific to said Open Services Gateway Initiative environment.

3. The method according to claim 1, further comprising:
   validating, prior to said re-packaging, Connected Limited Device Configuration compliancy of said MIDlet suite.

4. The method according to claim 1, further comprising:
exporting at least one Mobile Information Device Profile application programming interface package to a namespace database maintained by said Open Services Gateway Initiative environment.

5. The method according to claim 2, further comprising:
utilizing at least one of said added interface element and said at least one configuration parameter for at least one of installing said re-packaged MIDlet suite and executing said installed MIDlet suite as a standard Open Services Gateway Initiative application.

6. An apparatus comprising:
a re-packager configured to re-package a MIDlet suite by adding to said MIDlet suite an interface element to an Open Services Gateway Initiative environment, wherein said MIDlet suite is deployed in an Open Services Gateway Initiative environment, and wherein said interface element is an element providing a connection between said Open Services Gateway Initiative environment and the re-packaged MIDlet suite in order to enable said Open Services Gateway Initiative environment to launch and stop at least one MIDlet of the re-packaged MIDlet suite.

7. The apparatus according to claim 6, wherein said re-packager is further configured to add to said MIDlet suite at least one configuration parameter specific to said Open Services Gateway Initiative environment.

8. The apparatus according to claim 6, further comprising:
a validator configured to validate, prior to said re-packaging, Connected Limited Device Configuration compliancy of said MIDlet suite.

9. The apparatus according to claim 6, further comprising:
an exporter configured to export at least one Mobile Information Device Profile application programming interface package to a namespace database maintained by said Open Services Gateway Initiative environment.

10. The apparatus according to claim 6, wherein said interface element comprises at least one Java class file.

11. The apparatus according to claim 7, wherein at least one configuration parameter is configured into one of a manifest file and an additional configuration parameter file.

12. A computer readable storage medium stored with instructions, which when executed by a data-processing device, causes the device to perform:
re-packaging a MIDlet suite by adding to it an interface element to an Open Services Gateway Initiative environment, wherein said MIDlet suite is deployed in said Open Services Gateway Initiative environment, and wherein said interface element is an element providing a connection between said Open Services Gateway Initiative environment and the re-packaged MIDlet suite in order to enable said Open Services Gateway Initiative environment to launch and stop at least one MIDlet of the re-packaged MIDlet suite.

13. The computer readable storage medium according to claim 12, wherein said re-packaging said MIDlet suite further comprises adding to said MIDlet suite at least one configuration parameter specific to said Open Services Gateway Initiative environment.

14. The computer readable storage medium according to claim 12, further stored with instructions which when executed by said data-processing device cause said device to perform:
validating, prior to said re-packaging, Connected Limited Device Configuration compliancy of said MIDlet suite.

15. The computer readable storage medium according to claim 12, further stored with instructions which when executed by said data-processing device cause said device to perform:
exporting at least one Mobile Information Device Profile application programming interface package to a namespace database maintained by said Open Services Gateway Initiative environment.

16. The computer readable storage medium according to claim 13, further stored with instructions which when executed said data-processing device cause said device to perform:
utilizing at least one of said added interface element and said at least one configuration parameter for at least one of installing said re-packaged MIDlet suite and executing said installed MIDlet suite as a standard Open Services Gateway Initiative application.

* * * * *

UNITED STATES PATENT AND TRADEMARK OFFICE
CERTIFICATE OF CORRECTION

PATENT NO. : 7,640,542 B2  Page 1 of 1
APPLICATION NO. : 11/098576
DATED : December 29, 2009
INVENTOR(S) : Herenyi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1128 days.

Signed and Sealed this

Twenty-first Day of December, 2010

David J. Kappos
*Director of the United States Patent and Trademark Office*